Dec. 30, 1969   M. R. ZIMMERMANN   3,486,305
APPARATUS FOR THE RECOVERY OF SOLVENTS FROM THE AIR
Filed Nov. 27, 1967
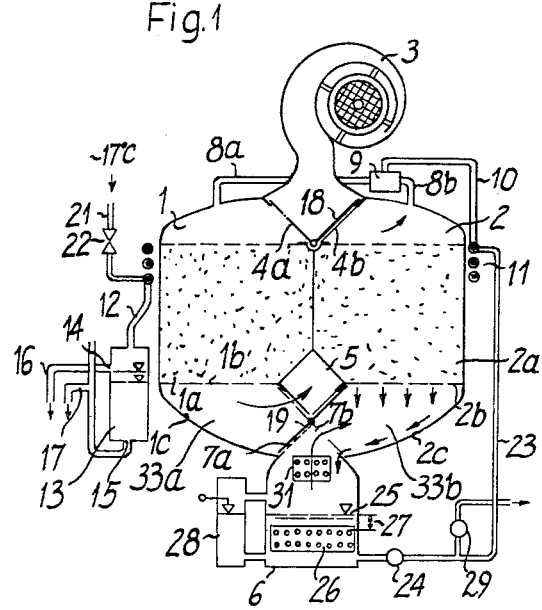
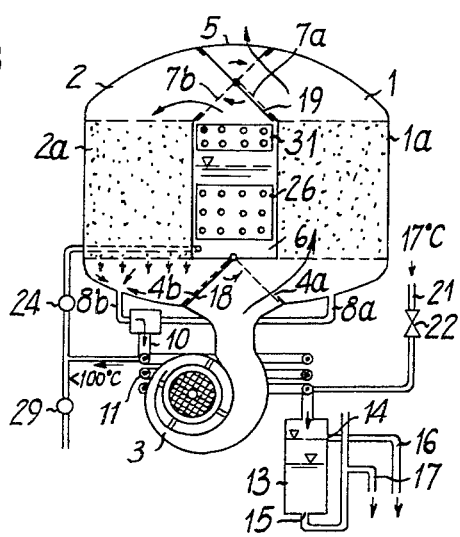
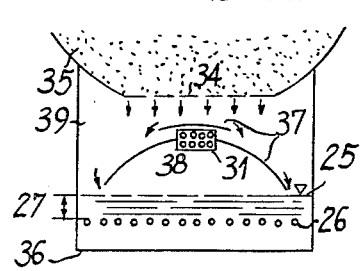

`United States Patent Office`

3,486,305
Patented Dec. 30, 1969

3,486,305
APPARATUS FOR THE RECOVERY OF SOLVENTS FROM THE AIR
Martin Richard Zimmermann, Schwachhauser Heerstr. 311, Bremen, Germany
Filed Nov. 27, 1967, Ser. No. 685,816
Claims priority, application Germany, Nov. 26, 1966, 1,519,948
Int. Cl. B01d 53/04, 53/00
U.S. Cl. 55—198     9 Claims

ABSTRACT OF THE DISCLOSURE

A device for the recovery of solvents from air, especially of per- and trichloroethylene, by the introduction of a filter containing activated charcoal into an air supply canal for the air containing the solvent for the purpose of adsorption of the solvent from the air onto the activated charcoal and by subsequent switching over of the filter chamber for the purpose of desorption of the solvent from the activated charcoal by means of flushing steam by connection on one side to an individual steam generator provided for the desorption and on the other side to a condenser for the purpose of subsequent separation of flushing steam and solvent by condensation, the steam generator being directly connected, by means of its steam chamber, to the filter chamber.

BACKGROUND OF THE INVENTION

It is known to catch particles of activated charcoal which fall out of the filter chamber into the steam chamber of the steam generator, together with the condensate dripping down, by means of a collecting device below the open underside of the activated charcoal chamber and to lead off the condensate and particles thus collected.

The present invention is based upon the consideration that, for the proper functioning of the apparatus, it is not necessary to collect and lead off the condensate, together with the descending particles of charcoal, but that it is only necessary to ensure that no particles of charcoal fall onto the hot surfaces of the steam generator. The formation of poisonous phosgene gas occurs when particles of activated charcoal containing halogenated solvents, such as per- and trichloroethylene, are heated well above 100° C. In order to avoid this dangerous chemical reaction, the only thing that matters is the avoidance of a direct contact of particles falling out of the filter chamber with the hot surfaces of the steam generator. This can, admittedly, be prevented by the provision of a condensate trap but such a solution to the problem is not the subject of the present invention.

SUMMARY OF THE INVENTION

According to the present invention, a direct contact of the descending charcoal particles with the hot surfaces of the steam generator is prevented by an arrangement in which the heating body or bodies of the steam generator are arranged so that they are protected against direct contact with particles falling out of the filter chamber.

DETAILED DESCRIPTION OF THE INVENTION

A continuous fall space extends from the chamber containing the activated charcoal to the water level of the steam generator for the matter descending from the filter, which is constructed as an immersion evaporator and is connected to the lower side of the filter chamber. This fall space is free of heating body surfaces. Thus, there is achieved the advantage that not only descending droplets of condensate but also particles of activated charcoal are immersed in the water of the steam generator so that they cannot be subjected to a dangerously high temperature and that, in the subsequent evaporation process, solvent present in the condensate and in the particles of activated charcoal are also evaporated and are included in the recovery process.

Means are preferably provided in the steam generator for the maintenance of a head of water above the immersed heating body of the steam generator connected to the lower side of the filter chamber so that the water level can form the lower limit of the fall space above the heating body.

The fall space between the chamber for the activated charcoal and the water level of the steam generator only forms a part of the steam chamber, while in a part of the steam chamber lying above the fall space there are provided heating bodies for the super-heating of the flushing steam. These super-heaters can, in known manner, also lie vertically below the opening of the chamber for the activated charcoal, and the steam chamber above the super-heater is shielded from the fall space by roof-shaped descending guide surfaces on which the descending condensate and the particles of activated charcoal are conducted to the water level of the steam generator. The super-heaters can, however, also lie in a part of the steam chamber which is arranged laterally to the region of the steam chamber that lies vertically below the opening of the filter chamber.

Especially in the case of the lateral arrangement of the super-heater and of the steam generator as a whole, there can be achieved very simple and economic overall plant construction in that two activated charcoal chambers are alternately switched into the flow of steam from a common steam generator. The upper opening of the steam generator thereby expediently lies between the two fall chambers below the two filter chambers.

The arrangement of the alternating operation of the two filter chambers in the adsorption and desorption operation can be achieved particularly simply and economically in that between the common steam condenser and the steam exit sides of the two filter chambers, there is provided an appropriate valve arrangement for the switch-over which opens the steam exit canal of the filter being used for the adsorption operation to the condenser and, at the same time, closes the steam exit canal of the filter being used for the desorption operation. Furthermore, the heat economy can be increased because the feed water for the steam generator is pre-heated in the condenser for the flushing steam by connecting the cooling system of the condenser into the feed water line for the steam generator.

Another solution of the problem forming the basis of the present invention is the connection of the steam chamber of the steam generator onto the upper side of the filter chamber. There is thus also achieved the advantage that the direction of the steam and the direction of fall of the condensate are coordinated in the filter chamber.

For a better understanding of the present invention. reference will now be made to the accompanying drawings, in which:

FIG. 1 shows a schematic illustration of a twin arrangement of two activated charcoal units operating alternately in the adsorption and desorption operation;

FIG. 2 shows a partial view of another embodiment of an activated charcoal unit according to the present invention; and FIG. 3 shows a twin arrangement in which the filter chambers are subjected to the action of steam from above.

Referring now to the twin arrangement illustrated in FIG. 1, two activated charcoal devices are operated alternately in the adsorption and desorption operation, especially in order to recover solvents, such as per- and trichloroethylene, from the air, such as is present, for example, in machines for cleaning textiles, plant for degreasing metals or in an extraction plant. Of the two activated charcoal chambers 1 and 2, at any one time, one of them, for example, the left-hand chamber 1, works in the adsorption operation and the other one, for example, the right-hand chamber 2, works in the desorption operation. In the case of the adsorption operation, the air to be purified and from which the solvent is to be recovered, in drawn in by means of a fan 3, via an entry opening 4a, and forced into the left-hand activated charcoal chamber 1 and, after purification, blown back via an exit opening 5 into the atmosphere.

In the case of the desorption operation in the right-hand chamber 2, flushing steam is passed from a steam generator 6 via a steam entry opening 7b into the right-hand chamber 2 and emerges, loaded with solvent, via a pipe 8b. Via a differential pressure valve 9 and a pipe 10, this steam-solvent vapour mixture is passed to a countercurrent condenser 11, from which the liquid mixture of steam condensate and solvent condensate flows via a pipe 12 to a separation vessel 13 for water and solvent. From this separation container, the steam condensate is taken off at a comparatively high point 14 and the solvent condensate, which has a higher specific gravity, is taken off from the bottom at 15. The steam condensate flows off via a pipe 16, while the solvent can be led off via a pipe 17 to a collecting vessel for reuse.

After a certain period of time, depending upon the operating conditions, for example, after one or two hours, in which, as is known from experience, the activated charcoal 1a in the filter chamber 1 has become enriched with solvents to such an extent that a continuation of the adsorption would be uneconomical and in which, at the same time, in the right-hand filter chamber adsorbed solvent has been flushed out of the activated charcoal 2a to such an extent that a continuation of the desorption operation would be uneconomical, the functions of the two filter chambers are changed by switching over the left-hand chamber from adsorption to desorption and switching over the right-hand chamber from desorption to adsorption.

For this switching over, there are provided flaps 18 and 19 which, for the switching over, are tilted by about 90° in a counterclockwise direction. By means of the flap 18, the air entry opening 4b of the chamber 2, which was closed during the desorption operation in the chamber 2, is opened to the fan 3 and the air entry opening 4a for the filter chamber 1 is closed. By means of the flap 19, the steam entry opening 7a to the filter chamber 1, which was closed during the adsorption operation in the filter chamber 1, is opened and the air entry opening 5 of the chamber 1 is closed.

The switch-over of the steam exit canals 8a and 8b of the filter chambers 1 and 2 is carried out automatically by the differential pressure between the two chambers, which acts upon the valve 9 constructed as a differential pressure valve and adjusts this valve in such a manner that the connection of the canal 8b to the pipe 10 is closed and the connection of the exit canal 8a to the pipe 10 is opened. The differential pressure valve 9 is, on the one hand, subjected to the pressure of the air from the fan 3 of, for example, 0.03 atmosphere, which acts via the connection 8b on the differential pressure valve and vai the connection canal 8a from the pressure of the steam-solvent vapour mixture in the filter chamber 1, which amounts to about 0.2 to 0.3 atmosphere.

The feed water for the steam generator 6 is preheated in the condenser 11. For this purpose, the condenser consists of a coil of tubes concentrically enclosing one another. The inner tube coil is connected to the water pipe 21 via a closure valve 22 and the cooling water has an entry temperature of about 17° C. in countercurrent to the steam-solvent vapour mixture to be condensed, which flows through the outer pipe coil. The cooling and feed water emerges from the condenser with a temperature of up to about 100° C. and passes via a feed pipe 23, provided with a magnetic valve 24, into the steam generator 6. The magnetic valve 24 is operated in response to the water level 25 in the steam generator 6, so that in the steam generator there is continuously maintained a head of water 27 above the immersed electrical heating body 26. For this purpose, a water level regulator 28 is attached to the steam generator 6 which controls the magnetic valve 24 via a switch contact operated by the liquid level.

If, after the desired water level in the steam generator is reached, the magnetic valve 24 is closed, then an overflow valve 29 opens a branch pipe 30 to an overflow in order to maintain the water flow in the condenser 11. The overflowing water can be used again. The steam formed in the steam generator is superheated to about 140–150° C. by a superheater 31 in the steam chamber of the steam generator so that desorption takes place with dry steam.

The activated charcoal fillings 1a and 2a rest upon perforated plates 1b and 2b, respectively, which thus, in the desorption operation, form the upper limit of the steam chamber of the steam generator. Particles of activated charcoal entrained with solvent and falling through the perforated plate must not, when, for example, the solvent is chlorinated or fluorinated hydrocarbons which are subject to dangerous chemical conversion reactions be heated up to the critical temperature at which the chemical change of the solvent used takes place. These charcoal particles falling down from the filter chamber must, therefore, be prevented from coming into contact with the hot surfaces of the heating bodies 26 and 31. A direct contact with the hot surface of the heating body 26 is prevented since this heating body is continuously submerged in water 27 so that particles of charcoal reaching the steam generator fall into water heated to about 100° C. Solvent present in the charcoal particles is evaporated, together with the water, and passes into the recovery process.

A contact with the hot surfaces of the superheater 31 is, in the example illustrated in FIG. 1, prevented in that the superheater 31 lies in a part 32 of the steam chamber which is arranged laterally to the steam chamber region which lies vertically under the perforated plate 2b. For the particles of activated charcoal and droplets of condensate falling from the filter chamber, there is thus provided a continuous fall space which leads from the activated charcoal chamber to the water level 25 of the immersion evaporator and is free of heating body surfaces. The fall spaces 33a and 33b below the perforated plate 1b and 2b, respectively, are defined at the bottom by guiding surface 1c and 2c, respectively, which are inclined downwardly to the steam generator 6, and guide condensate and particles of activated charcoal into the steam generator without coming into contact with the heating bodies of the steam generator.

In FIG. 2 there is illustrated another embodiment in which, directly below the perforated plate 34 of an activated charcoal chamber 35, there is provided a steam generator 36 with immersion heating body 26 and a superheater 31 lying in the steam chamber. Above the immersed heating body 26 there is continuously maintained, as in the case of the first embodiment, a head of water 27, whereby there is achieved an effective protection against dangerous heating of the descending particles of activated charcoal. The superheater 31 lying vertically below the perforated plate 34 in the steam chamber of the steam generator is screened from the plate 34 by a baffle or roof-shaped, descending guide surfaces 37. By means of these guide surfaces 37, the steam chamber of the steam generator is divided into two chambers 38 and 39. The chamber 38, lying over the middle of the water level 25 in the steam generator, contains the superheater 31, while part 39 of the steam chamber covering this chamber in the manner of a bell forms a continuous fall space for condensate and particles of activated charcoal, this space extending from the perforated plate 34 to the water level 25.

FIG. 3 shows a constructional form in which the steam chamber of the steam generator 17 is not attached to the lower side but rather to the upper side of the filter chambers, while the air to be purified flows up through the filter chambers from below. Corresponding parts are provided with the same reference numerals as in FIG. 1. Descending condensate and activated charcoal particles can flow off via the condenser 11 to the separating vessel 13. Activated charcoal particles can also be held back by a filter or collecting sieve inserted into the pipe to the condenser. The solvent entrained therewith is taken up by the steam and passed to the condenser and the separator container.

Within the scope of the present invention, some alterations and other constructions are also possible. In particular, the continuous fall space for the activated charcoal and condensate particles could lead, instead of to the water level of the steam generator, to another place, for example, to a vessel which is attached behind the magnetic valve 24 in the feed pipe of the steam generator.

I claim:

1. Apparatus for the recovery of solvents from air, especially of per- and trichloroethylene, by the insertion of a filter chamber filled with activated charcoal into an air feed canal for the air containing solvent for the purpose of adsorption of the solvent from the air onto the activated charcoal and by subsequent switching over of the filter chamber for the purpose of desorption of the solvent from the activated charcoal by means of flushing steam, with connection to a steam generator provided for the desorption on one side and, on the other side, to a condenser for the purpose of subsequent separation of flushing steam and solvent by condensation, the steam generator, with its steam chamber, being directly connected to the filter chamber, the heating body or bodies of the steam generator being protected from direct contact with particles falling down out of the filter chamber, a continuous fall space for the condensate and activated charcoal particles falling out of a filter chamber leading from the activated charcoal chamber to the water level of the steam generator attached to the lower side of the filter chamber, this fall space being free of heating body surfaces.

2. Apparatus according to claim 1, wherein means are provided for the maintenance of a head of water above the heating body of the steam generator connected on the lower side of the filter chamber, the water level above the immersed heating body forming the lower boundary of the fall space.

3. Apparatus according to claim 1, wherein the fall space only takes up a part of the steam chamber between the water level of the evaporation vessel and the activated charcoal chamber, a steam superheater being housed in that part of the steam chamber lying above the fall space.

4. Apparatus according to claim 3, wherein the superheater lies vertically below the pass-through sieve of the filter chamber, the steam chamber above the superheater being bounded against the falling chamber by roof-shaped, descending guide surfaces.

5. Apparatus according to claim 1, wherein two activated charcoal chambers are provided which can be alternately switched into the steam current of a common steam generator.

6. Apparatus according to claim 5, wherein the opening of the steam generator lies between the fall spaces below the two filter chambers.

7. Apparatus according to claim 5, wherein between a common steam condenser and the steam exist sides of the two filter chambers, there is provided a valve means responding to the differential pressure between the filter chambers which opens the steam outlet canal of the filter being used for the desorption operation to the condenser and, at the same time, closes the steam outlet canal of the filter being used for the adsorption operation to the condenser.

8. Apparatus according to claim 1, wherein the feed water for the steam generator is preheated in a condenser for the flushing steam by connecting the cooling system of the condenser into the feed water pipe for the steam generator.

9. Apparatus according to claim 1 wherein the steam chamber of the steam generator is attached to the upper side of the filter chamber.

References Cited

UNITED STATES PATENTS

| 1,382,890 | 6/1921 | Burrell et al. | 55—59 |
| 1,742,247 | 1/1930 | Godel | 55—59 |
| 2,211,162 | 8/1940 | Ray et al. | 55—198 X |
| 3,134,652 | 5/1964 | D'Angelo et al. | |

REUBEN FRIEDMAN, Primary Examiner

R. W. BURKS, Assistant Examiner